United States Patent
Yaari

(10) Patent No.: US 7,430,733 B1
(45) Date of Patent: Sep. 30, 2008

(54) METHOD FOR VALIDATION OF BINARY CODE TRANSFORMATIONS

(75) Inventor: Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/940,750

(22) Filed: Nov. 15, 2007

(51) Int. Cl.
*G06F 9/45* (2006.01)

(52) U.S. Cl. .................. 717/154; 717/141; 717/151

(58) Field of Classification Search ......... 717/141–144, 717/146, 151–161; 714/37–39
See application file for complete search history.

(56) References Cited

U.S. PATENT DOCUMENTS

| | | | |
|---|---|---|---|
| 5,371,747 A * | 12/1994 | Brooks et al. .................. 714/38 |
| 5,450,575 A | 9/1995 | Sites |
| 5,758,051 A | 5/1998 | Moreno et al. |
| 5,790,867 A * | 8/1998 | Schmidt et al. ............. 717/155 |
| 5,802,373 A | 9/1998 | Yates et al. |
| 5,889,999 A | 3/1999 | Breternitz et al. |
| 5,966,539 A | 10/1999 | Srivastava |
| 5,966,541 A | 10/1999 | Agarwal |
| 6,035,123 A | 3/2000 | Razdan et al. |
| 6,075,942 A | 6/2000 | Cartwright, Jr. et al. |
| 6,226,789 B1 | 5/2001 | Tye et al. |
| 6,275,981 B1 | 8/2001 | Buzbee et al. |
| 6,289,505 B1 | 9/2001 | Goebel |
| 6,292,938 B1 | 9/2001 | Sarkar et al. |
| 6,530,079 B1 | 3/2003 | Choi et al. |
| 6,598,221 B1 | 7/2003 | Pegatoquet et al. |
| 6,748,584 B1 * | 6/2004 | Witchel et al. ............. 717/136 |
| 6,829,733 B2 * | 12/2004 | Richardson et al. ........... 714/38 |
| 7,185,328 B2 | 2/2007 | Grover |
| 7,207,038 B2 | 4/2007 | Bicsak et al. |
| 2004/0098710 A1 * | 5/2004 | Radigan ..................... 717/144 |
| 2004/0128659 A1 | 7/2004 | Robison |
| 2005/0257202 A1 | 11/2005 | Kaestner et al. |
| 2005/0268293 A1 * | 12/2005 | Kawahito et al. ........... 717/154 |
| 2006/0080645 A1 | 4/2006 | Miranda et al. |
| 2006/0130016 A1 | 6/2006 | Wagner |
| 2006/0282807 A1 * | 12/2006 | Ivancic et al. .................. 716/5 |

FOREIGN PATENT DOCUMENTS

| | | |
|---|---|---|
| EP | 1004961 | 5/2000 |
| WO | WO99/57635 | 11/1999 |

OTHER PUBLICATIONS

Wang et al., "BMAT—A Binary Matching Tool for Stale Profile Propagation," Journal of Instruction-Level Parallelism 2 (2000) 1-6 © 2000 Morgan Kaufmann Publishers. All rights reserved. pp. 1-20.

(Continued)

*Primary Examiner*—William H Wood
(74) *Attorney, Agent, or Firm*—Scully, Scott, Murphy & Presser, P.C.; Suzanne Erez, Esq.

(57) ABSTRACT

A method of validating binary code transformation in one aspect includes analyzing original program and transform program. Control flow graphs are generated for both programs. The two graphs are traversed to create respective linear invariant representations. The linear representations are compared to identify incorrect transformations.

1 Claim, 2 Drawing Sheets

OTHER PUBLICATIONS

Bakos, et al., "Lightweight Error Correction Coding for System-level Interconnects," IEEE Transactions on Computers, 2007, vol. 56, No. 3 (MAR), p. 289-304.

Bombin, H., et al., "Homological Error Correction: Classical and Quantum Codes," Journal of Mathematical Physics, vol. 48, No. 5, p. 52105-1-35 (2007).

Dodunekov, S.M., et al., "On Algebraic Decoding of Some Maximal Quaternary Codes and the Binary Golay Code," Translated in: Problems of Information Transmission, vol. 35, No. 4, p. 338-45, Oct.-Dec. 1999.

Dodunekov, S.M., et al., "Parallel Decoding of the (23, 12, 7) Binary Golay Code," IEE Proceedings—Computers and Digital Techniques, vol. 141, No. 2, p. 119-22, Mar. 1994.

Fu, C-M., et al., "Combined Error Concealment and Error Correction in Rate-Distortion Analysis for Multiple Substream Transmissions," IEEE Transactions On Image Processing, 2007, vol. 16, No. 4, p. 1022-1035.

Huang, S-W., et al., "Binary Code Design for High-Frequency Ultrasound," IEEE Transactions on Ultrasonics, Ferroelectrics and Frequency Control, vol. 54, No. 5, p. 947-56. May 2007.

Kim, J., et al., "Probability Quantizer for Multiplication Free Binary Arithmetic Code," Electronics Letters, Jun. 5, 1997, vol. 33, No. 12, p. 1030-1031.

Kwan, H.Y., et al., "Binary-Code-Allocation Scheme in DS-CDMA Systems," IEEE Transactions on Vehicular Technology, vol. 56, No. 1, p. 134-45 Jan. 2007.

Lee, W-T., et al., "A Single-Chip Viterbi Decoder For a Binary Convolutional Code Using an Adaptive Algorithm," IEEE Transactions on Consumer Electronics, vol. 41, No. 1, pp. 150-9, Feb. 1995.

Mihaljevic, M., et al., "A Sequence Comparison Approach for Decoding of General Binary Block Code After the Binary Summetric Channel with Synchronization Errors," Conference: ICIAM / GAMM 95. Part I, (Hamburg DEU), Jul. 3, 1995, vol. 76, No. SUP1, p. 479-480.

Mityakov, V.G., et al., "Comparison of Phase Masking Methods in Holographic Recording of Binary Code Transparencies," Translated in: Optics and Spectroscopy, vol. 57, No. 2, p. 184-8, Aug. 1984.

Nazarov, L.E., "Use of Fast Walsh-Hadamard Transformation for Optimal Symbol-by-Symbol Binary Block-code Decoding," Electronics Letters, vol. 34, No. 3, p. 261-2. Feb. 1998.

Nicol, D.M., et al., "Performance Analysis of Binary Code Protection," Conference: Proceedings of the 2005 Winter Simulation Conference (IEEE Cat. No. 05CH37732C) , p. 10 pp. 005.

Shuang, W., et al., "Secure Deterministic Communication In a Quantum Loss Channel Using Quantum Error Correction Code," Chinese Physics, vol. 16, No. 5, p. 1229-32, May 2007.

Tan, et al., "Optimization of an RTP Level Hybrid Error Correction Scheme for DVB Services Over Wireless Home Networks Under Strict Delay Constraints," IEEE Transactions on Broadcasting, vol. 53, No. 1, pt. 2, p. 297-307. Mar. 2007.

Testard, M., et al., "Tight Approximation of Bit Error Probability For L-Diversity Non-Coherent M-Ary FSK Frequency Hopping System With Binary Convolutional Code and Soft Viterbi Decoder: Diversity, Bit Interleaver Size and Reed-Solomon Outer Code Effects Analysis on Receiver Performance for M=8," Conference: MILCOM 97 MILCOM 97 Proceedings, IEEE Commun. Soc., AFCEA (Armed Forces Commun. & Electron. Assoc.) , Nov. 2-5, 1997, Monterey, CA, USA.

Tomlinson, M., et al., "Analysis of the Distribution of the Number of Erasures Correctable by a Binary Linear Code and the Link to Low-Weight Codewords," IET Communications, vol. 1, No. 3, p. 539-48. Publisher: Inst. of Eng. and Technol, Jun. 1, 2007.

Valembois, A., et al., "Detection and Recognition of a Binary Linear Code," Discrete Applied Mathematics, vol. 111, No. 1-2, p. 199-218. Publisher: Elsevier, Jul. 15, 2001.

Wang, Q., et al., "Coded QAM Using a Binary Convolutional Code," IEEE Transactions on Communications, vol. 43, No. 6, p. 2001-4, Jun. 1995.

Zhang, L., et al. "A Time Domain Synthesized Binary Phase Code Sidelobe Suppression Filter Based on Genetic Algorithm," Conference: Proceedings of 5th International Conference on Signal Processing, Aug. 21-25, 2000, Beijing, China.

Eakman, G, "Verification of Platform Independent Models," Pathfinder Solutions, 2003.

Harris et al., "Practical Analysis of Stripped Binary Code," Computer Sciences Department, 2005.

* cited by examiner

METHOD FOR VALIDATION OF BINARY CODE TRANSFORMATIONS

FIELD OF THE INVENTION

The present disclosure relates to optimizing computer executable codes, and particularly to a method for validating binary code transformation.

BACKGROUND OF THE INVENTION

Optimizing executable code is a known technique to improve the performance of code that has already been linked and is ready for execution. It is typically performed using a runtime profile of the code. Different optimization techniques are available such as inlining and code restructuring, which transform the code to functionally equivalent form. If the code optimization does not correctly transform the code to functionally equivalent form, unpredictable consequences may result, such as a program crash.

While there are existing technologies that perform validations on program source code, semantics of compiler's internal representation of a code, or even hardware level code, those technologies are incapable of handling the kind of transformations performed on the binary applications. Thus, what is desirable is a method that helps to validate the correctness of binary code transformations.

BRIEF SUMMARY OF THE INVENTION

A method for validating binary code transformations is provided. In one aspect, the method may comprise analyzing binary code of an executable program to produce a sequence of basic units; generating control flow graph associated with the sequence of basic units; generating invariant linear function representation based on the control flow graph; analyzing optimized transformation of the executable program to produce a second sequence of basic units; generating second control flow graph associated with the second sequence of basic units; generating second invariant linear function representation based on the second control flow graph; comparing the invariant linear function representation and the second invariant linear function representation; and identifying one or more incorrect transformations in the optimized transformation.

A program storage device readable by a machine, tangibly embodying a program of instructions executable by the machine to perform the above method may also be provided.

Further features as well as the structure and operation of various embodiments are described in detail below with reference to the accompanying drawings. In the drawings, like reference numbers indicate identical or functionally similar elements.

DETAILED DESCRIPTION

The binary code of the original program and the transformed program are analyzed, using various available techniques such as static techniques using relocation information and/or dynamic techniques by intercepting execution and recognizing the accessed basic units, and a control flow graph for both programs is generated. For each validated function, the two graphs are both traversed in consistent fashion, creating their linear invariant textual representations. These linear representations can be compared as simple text strings in order to identify incorrect transformation.

Figure 1:
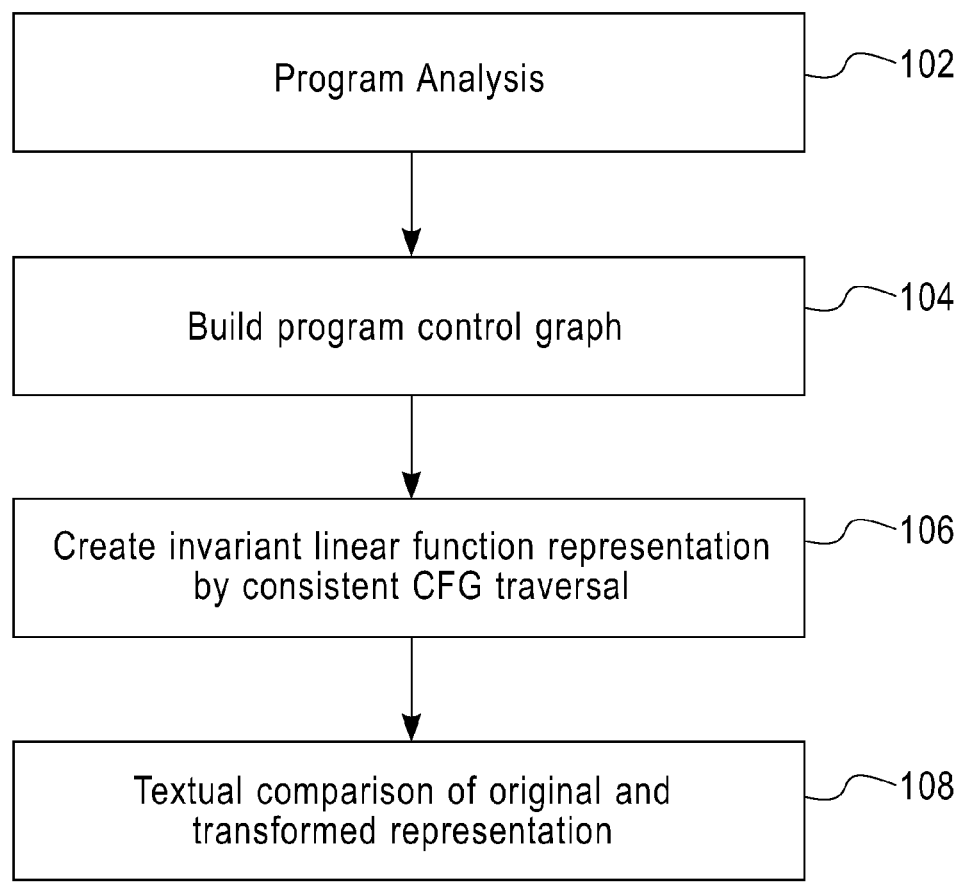
FIG. 1 is a flow diagram illustrating a method for validating binary code transformation in one embodiment of the present disclosure.
Figure 2:
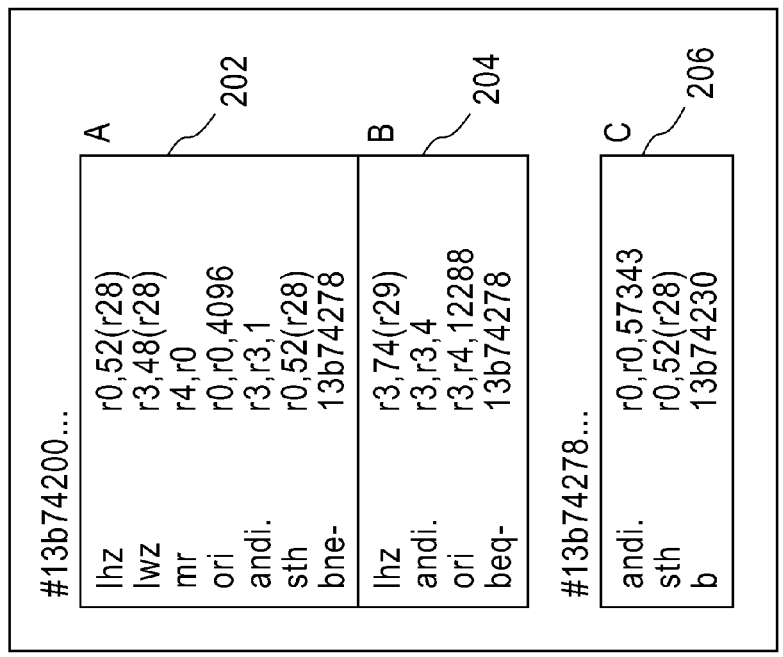
FIG. 2 shows an example sequence of three basic blocks.

FIG. 1 is a flow diagram illustrating a method for validating binary code transformation in one embodiment of the present disclosure. Steps 102, 104 and 106 are performed for both the original and the transformed codes. At 102, program analysis begins. The executable program is analyzed using the FDPR (Feedback Directed Program Restructuring) technology. Briefly, FDPR optimizes the executable image of a program by collecting information on the behavior of the program while the program is used for some typical workload, and then creating a new version of the program that is optimized for that workload. The principal output of this analysis is a sequence of basic units. Basic units are the smallest elements of the program that stay intact under every reordering. In this embodiment of the disclosure, the basic units include two types, basic blocks and data objects. The basic blocks type includes instructions. The data objects type includes data, for example, read-only and writable. Data objects correspond to the high-level data objects defined in the source program, for example, arrays, structures, or scalars. A basic block is a sequence of instructions that can be entered only at its beginning and exited only at its end. FIG. 2 shows an example sequence of three basic blocks 202, 204, 206, of which two 202, 204 are adjacent.

Figure 3:
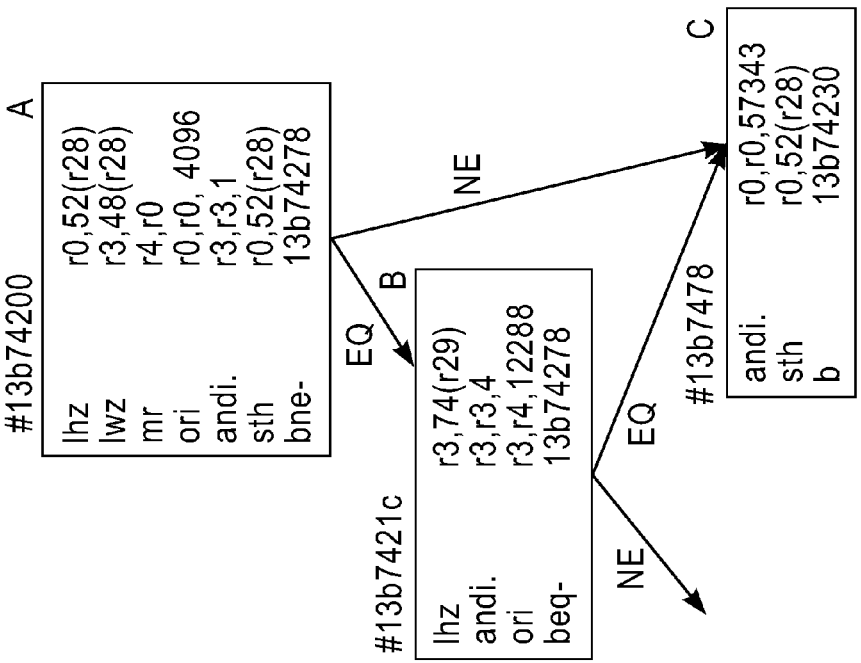
FIG. 3 shows the FCG for the basic blocks in FIG. 2.

Referring back to FIG. 1, at 104, building a program control flow graph (CFG) begins. In one embodiment, building the CFG is done by connecting, with a directed edge, the exit point of each basic block A to the entry points of the basic blocks according to the way A terminates. For instance, if A terminates by a simple branch, connect to the target of the branch. If A terminates by a conditional branch, connect to both the target of the branch, as well as the following basic block (called the fall-through basic block). If A terminates by an indirect branch keep A unconnected at the moment, as the target is not known at this moment. FIG. 3 shows the CFG for the basic blocks in FIG. 2.

An edge in the CFG carries an execution count, that is, the number of times control passed along that edge when the program was executed. This information can be collected by various means, for example, the "pixie" tool, or the basic block profiling provided by standard compilers like GCC. An edge that carries relatively high execution count is termed hot edge. A basic block that executes many times relative to the average count is termed hot basic block.

Referring back to FIG. 1, at 106, invariant linear function representation is created by consistently traversing the CFG. This step forms an invariant linear representation for a given function. Invariant representation refers to one or more invariants under a set of predefined optimization transformations of the function. An optimization transformation is a transformation of the code that preserves the semantics of the function while providing some potential improvement, typically in execution time.

The basic set of transformations includes at least code restructuring, function inlining, and hot-cold code motion. Code restructuring is an optimization, which places basic blocks close to each other if they are connected by relatively hot edges. For example, basic block A (shown in FIG. 2 and FIG. 3) ends with a BNE branch (branch of not equal), following basic block B, for the EQ condition. Under code restructuring, if the edge A-C is much hotter then A-B, the condition that ends A might be changed to EQ (that is, BEQ) so that basic block C will be the fall-through basic block A. Similarly, basic blocks that connect by edges with cold branches may be placed far from each other, sometimes requiring an additional intermediate branch in between if the distance is too great for the original branch to be performed in one hop.

Function inlining replaces the call instruction by a copy of the function in places where the call instruction is very hot. Hot-cold code motion optimization moves instructions from hot basic block to a colder one, making sure these instructions are properly replicated to preserve the semantics.

The following algorithm is used to create an invariant linear representation of a function in one embodiment. The representation is in a form of a sequence of strips A strip is a possible path through the program CFG, that is, a trace of non-branch instructions that may execute sequentially when the program runs.

```
Function CreateInvariantRepresentation (ControlFlow-
Graph cfg Function f)
    // Control Flow Graph cfgis the CFG of the program
    // Node f is the entry point of the give
    Stack returnStack=<empty>// a stack of nodes in cfg
    Stack entryPointStack=<empty>// a stack of nodes in cfg
    List stripList=<empty>// the output list of strips.
    Node epf=EntryPoint(f)
    Push(epf, entryPointStack)
    wile entryPointStackis not empty do
        ep=Pop(entryPointStack)
        If ep has not been traversed then
            strip=Traverse(ep, returnStack, entryPointStack)
            Add(strip, stripList)
        End if
    End while
    Return stripList
End function
    Function Traverse (Node entry, InputOutput Stack return-
Stack, InputOutput Stack entryPointStack)
    List Strip=<empty>// output strip (list of instructions)
    Node bb entry, firstBB, secondBB
    While bb is not <empty> do
        // add basic block to strip
        Foreach Instruction instr in BasicBlock(bb) do
            Add(instr, Strip)
        End foreach
        Mark bb as traversed
        // sechedule BBs at edges of bb
        Bool firstIsCall (Edge(bb, First) is a call)
        firstBB=RetrieveNode(Edge(bb, First), returnStack)
        If firstBB is not <empty> then
            secondBB=RerieveNode(Edge(bb, Second), return-
                Stack)
        Else
            firstBB=RetrieveNode(Edgeb, Second), returnStack)
            secondBB=<empty>
        End if
        If firstBB is not <empty> then
            if secondBB is not <empty> then
                // schedule second node. If this is a call edge, push
                    called
                function's entry point node on return stack
                // else push node on entry point stack
                Stack stack=firstIsCall? returnStack: entryPoint-
                    Stack;
                Push(secondBB, stack)
            End if
            End if
            bb=firstBB
        End while
        // reached a traversed node or end of function
        Return strips
End function
    Function RetrieveNode(Edge edge, InputOutput Stack
returnStack)
    Node retrievedBB=<empty>
    If edge exists and is direct then
        // continue traversing this function
        retrievedBB=Node(edge)
    Else if edge is a return instruction (e.g. 'blr' in POWER
        arch.) then
        // traverse back to caller
        retrievedBB=Pop(returnStack)
    End if
    // do not proceed in this direction if node has been traversed
        already
    If retievedBB is not <empty> and retriebedBB is not tra-
        versed then
        Return retrievedBB
    Else
        Return <empty>
    End if
End function
```

An example strip follows. In the example, the branch instructions, which are not part of the strips, are commented out.

Strip 6:

```
#13b2b29c ...
#   41 86 00 48    beq-      cr1,13b2b2e4 <.pevm__EXECC+0x504>
#13b2b2e4 ...
    e8 7d 00 08    ld        r3,8(r29)
    28 9b 05 7b    cmplwic   r1,r27,1403
    e8 63 00 c8    ld        r3,200(r3)
    80 03 00 9c    lwz       r0,156(r3)
    70 00 00 40    andi.     r0,r0,64
#   41 82 00 14    beq-      13b2b30c <.pevm_EXECC+0x52c>
#13b2b30c ...
    a0 1c 00 34    lhz       r0,52(r28)
    70 03 00 40    andi.     r3,r0,64
#   40 82 00 34    bne-      13b2b348 <.pevm_EXECC+0x568>
    80 bc 00 50    lwz       r5,80(r28)
    e8 dc 00 56    lwa       r6,84(r28)
    e8 7d 00 08    ld        r3,8(r29)
    e8 9d 00 88    ld        r4,136(r29)
    39 20 00 00    li        r9,0
    e8 63 00 00    ld        r3,0(r3)
    38 e0 00 00    li        r7,0
    39 00 00 00    li        r8,0
    e8 84 00 00    ld        r4,0(r4)
#   4b 9f ed 45    bl        1352a080 <.kgicls>
    60 00 00 00    nop
    a0 1c 00 34    lhz       r0,52(r28)
    54 00 04 3c    rlwinm    r0,r0,0,16,30
    80 7c 00 58    lwz       r3,88(r28)
    2c 23 00 00    cmpdi     r3,0
    b0 1c 00 34    sth       r0,52(r28)
#   41 82 00 0c    beq-      13b2b364 <.pevm_EXECC+0x584>
#13b2b364 ...
    7f a3 eb 78    mr        r3,r29
    7f 64 db 78    mr        r4,r27
#   4b fe 8b b5    bl        13b13f20
                             <.pevm_handle_external_error>
    60 00 00 00    nop
#   48 00 01 34    b         13b2b4a8 <.pevm_EXECC+0x6c8>
Strip 7:
```

-continued

```
#13b2b35c...
    e8 7d 00 b0   ld    r3,176(r29)
    93 c3 00 98   stw   r30,152(r3)
Strip 8:

#13b2b2fc...
#   40 86 00 10   bne-  cr1,13b2b30c <.pevm__EXECC+0x52c>
    7f a3 eb 78   mr    r3,r29
#   4b fe 9e 9d   bl    13b151a0 <.pfrfoe__flush__oci__error>
    60 00 00 00   nop
```

At 108, the generated strips of two implementations of a function are compared. The comparison can be a textual or character-by-character comparison. Incorrect transformations are identified from the comparison. For example, the strip or strips corresponding to the transformed or optimized code that do not match the strip or strips of the original code are identified as being incorrect.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for validating binary code transformations, comprising:
    analyzing binary code of an executable program to produce a sequence of basic units comprising smallest elements of the executable program that stay intact under every reordering;
    generating control flow graph associated with the sequence of basic units;
    generating invariant linear function representation based on the control flow graph;
    analyzing optimized transformation of the executable program to produce a second sequence of basic units;
    generating second control flow graph associated with the second sequence of basic units;
    generating second invariant linear function representation based on the second control flow graph;
    comparing the invariant linear function representation and the second invariant linear function representation; and
    identifying one or more incorrect transformations in the optimized transformation,
    wherein the invariant linear function representation and the second invariant linear function representation are invariants under a set of predefined optimization transformation and include a sequence of strips comprising a path through a trace of non-branch instructions executing sequentially when the executable program runs.

* * * * *